United States Patent Office 3,591,632
Patented July 6, 1971

3,591,632
METHOD FOR RECOVERING TRANS-TRAUMATIC ACID
August J. Pacini, San Pedro, Calif., assignor to Purex Corporation, Ltd., Lakewood, Calif.
No Drawing. Continuation-in-part of application Ser. No. 380,071, July 2, 1964. This application Jan. 29, 1968, Ser. No. 701,136
Int. Cl. C07c 51/42
U.S. Cl. 260—537    2 Claims

ABSTRACT OF THE DISCLOSURE

Essentially pure trans-traumatic acid is obtained from a mixture of cis- and trans-isomers by twice recrystallizing the acid from acetonitrile solution.

REFERENCE TO RELATED APPLICATIONS

This application is a continuation-in-part of my copending application Ser. No. 380,071, filed July 2, 1964, now abandoned.

BACKGROUND OF THE INVENTION

(1) Field of the invention

This invention has to do with preparation of trans-traumatic acid (TTA), otherwise known as trans-1-decene-1,10-dicarboxylic acid. Specifically the invention is concerned with the effective separation of trans-isomer from cis-isomer.

(2) Prior art

The preparation of TTA has been described in U.S. Pat. 2,339,255 and U.S. Pat. 2,391,824 both to English, Jr. et al. It is known that the trans- form of this acid is the naturally occurring form, JACS 67, 1171–5 (1945) and is the desired product for therapeutic use with humans. Synthetic preparation of TTA however entails coproduction of cis-traumatic acid (CTA), which is of less value therapeutically. Hence, it is desirable to maximize obtention of pure TTA.

SUMMARY OF THE INVENTION

Double recrystallization of crude synthetic traumatic acid, consisting essentially of a mixture of cis- and trans-isomers of traumatic acid from solutions in acetonitrile effects a remarkably easy and complete separation of TTA from CTA.

DESCRIPTION OF THE PREFERRED EMBODIMENTS

TTA may be prepared by the oxidation of undecylenic acid, followed by hydrolysis with alkali to 10,11-dihydroxyhendecanoic acid. This acid is transferred to the sebacic semi-aldehyde which is then condensed with malonic acid and acidified. The resultant precipitate is then purified to TTA in accordance with the present recrystallization method.

EXAMPLE

A 1 liter three-necked flask is equipped with a mechanical stirrer, a thermometer and a dropping funnel. In the flask are placed 184 g. (1 mole) of undecylenic acid and 200 g. (4.35 moles) of formic acid. The stirrer is started and the reaction mixture is warmed by a water bath to 40° C. At this point, 113 g. (1.0 mole) of 30% hydrogen peroxide is added dropwise through the dropping funnel. The rate of addition of the peroxide is adjusted so that the temperature is kept at approximately 40° C. The mixture is kept at 40° C. for at least one-half hour after all the peroxide has been added.

The reaction mixture is transferred to a suitable flask for vacuum distillation of formic acid and any water under full vacuum of the water pump. The residual hydroxyformoxyhendecanoic acid is now ready for hydrolysis. This is accomplished by boiling the mixture with 1.3 liters of 2 N sodium hydroxide. The reaction mixture is cooled after boiling for one hour and acidified to a pH of 2, or slightly lower with 6 N hydrochloric acid. After cooling well in an ice bath, the solid acid is collected on a Buchner funnel (pre-chilled), washed with ice water and sucked as dry as possible. The solid is dried in a vacuum desiccator over flake sodium hydroxide. 205.0 g. of product equal to 93.92% of the theoretical yield is obtained.

A solution of 42.78 g. (0.2 mole) of sodium metaperiodate ($NaIO_4$) in 600 ml. of 1 N sulfuric acid is prepared. In a 1 l. flask equipped with a mechanical stirrer, a thermometer and a dropping funnel are placed 400 ml. of ethanol and 43.6 g. (0.2 mole) of 10,11 - dihydroxyhendecanoic acid. This solution is warmed to 40° C. and the periodate solution is added through the separatory funnel at a rapid rate while stirring the mixture. The temperature is maintained at 40° C. for 30–40 minutes after which the solution is cooled to 20° C., and any inorganic salts that separate are collected on a Buchner funnel, sucked dry and washed with ether to remove adherent organic material.

The ether washing is used to extract the aqueous filtrate along with additional ether as may be needed. A total of three extractions with about 200 ml. of ether in each extraction should be used. The combined ether extract is shaken with a small amount of anhydrous sodium sulfate to remove most of the water, after which the ether is distilled. The residual oil is then submitted to the full vacuum of a water pump to remove any alcohol and water remaining. An oily residue of sebacic semi-aldehyde, weighing 36.0 g. is obtained, 96.77% of theoretical yield. This product is used in the next step without further purification.

18.6 g. (0.1 mole) of the sebacic semi-aldehyde is mixed with 11.45 g. (0.11 mole) of malonic acid and 10.28 g. (0.13 mole) of pyridine in a 500 ml. round bottom flask. The mixture is allowed to stand for 24 hours at room temperature and then heated for 5 hours on a steam bath. The mixture is then cooled and diluted with about 10 volumes of water. Upon acidification to pH 2 with 2 N sulfuric acid and chilled to near 0° C., the crude 1-decene-1,10-dicarboxylic acid is collected on a Buchner funnel. It is sucked dry and washed with a small amount of ice cold water. Dry in a vacuum desiccator over flake caustic. The crude 1-decene-1,10-dicarboxylic acid, weighing 18.0 g. is dissolved in from 75 to 100 ml. of boiling acetonitrile at 760 mm. Hg and recrystallized twice. From 4 to 5 ml. of acetonitrile or more or less may be used per gram of crude acid for each recrystallization. The yield is 11.49 g. (50.3% of theory). The melting point is 164±1° C.

I claim:
1. Method of separating trans-traumantic acid from a mixture comprising cis- and trans-isomers of traumatic acid which comprises dissolving said mixture in acetonitrile and twice recrystallizing the trans-isomer from such solution of the mixture to separate said trans-isomer.
2. Method according to claim 1 in which said acetonitrile is boiling.

References Cited

UNITED STATES PATENTS 2,339,259   1/1944   English, Jr. et al. ____ 260—537

OTHER REFERENCES

English, Jr., J.A.C.S., 63, pp. 941–943 (1941).

LEWIS GOTTS, Primary Examiner

V. GARNER, Assistant Examiner

U.S. Cl. X.R.

260—488J, 526R, 530N